Jan. 29, 1963   M. L. WOODWARD ETAL   3,075,430
NON-GLARE MIRROR
Filed July 6, 1960   3 Sheets-Sheet 1
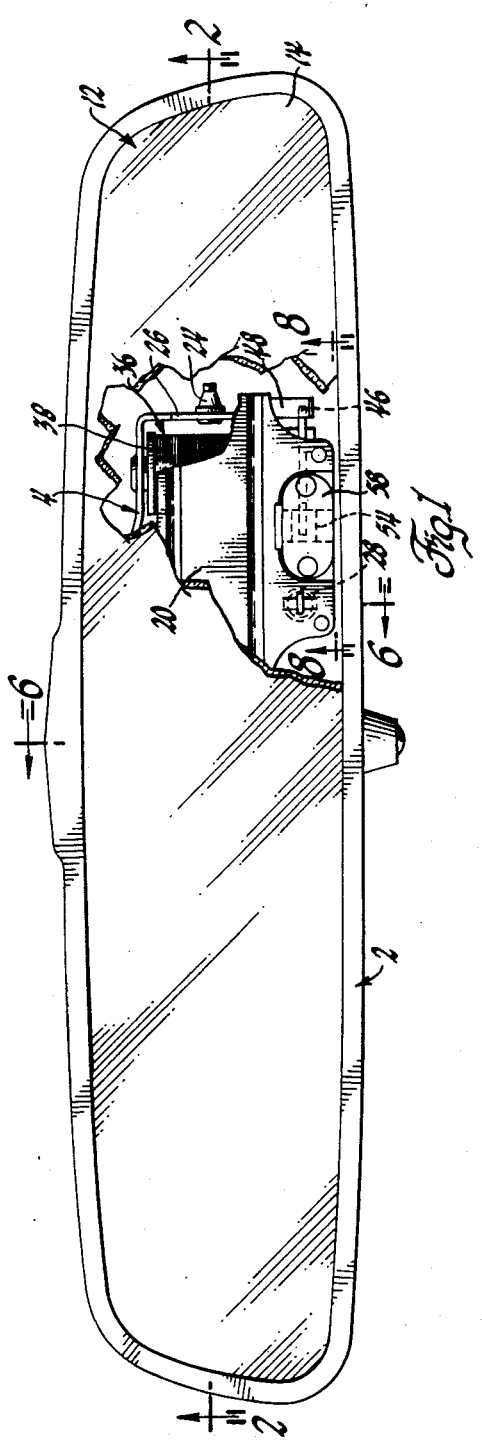
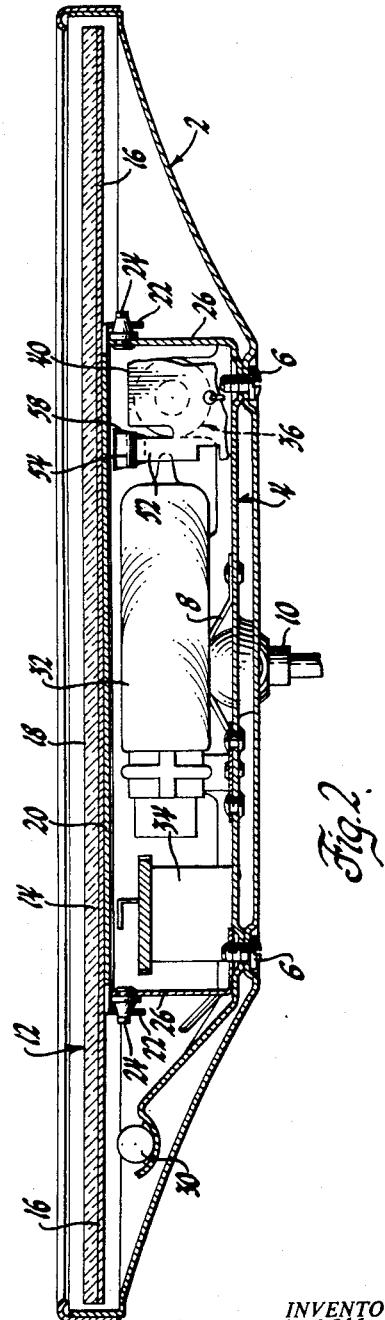
INVENTORS
Myrneth L. Woodward
BY Kenneth R. Skinner
G. E. McFlynn Jr.
ATTORNEY

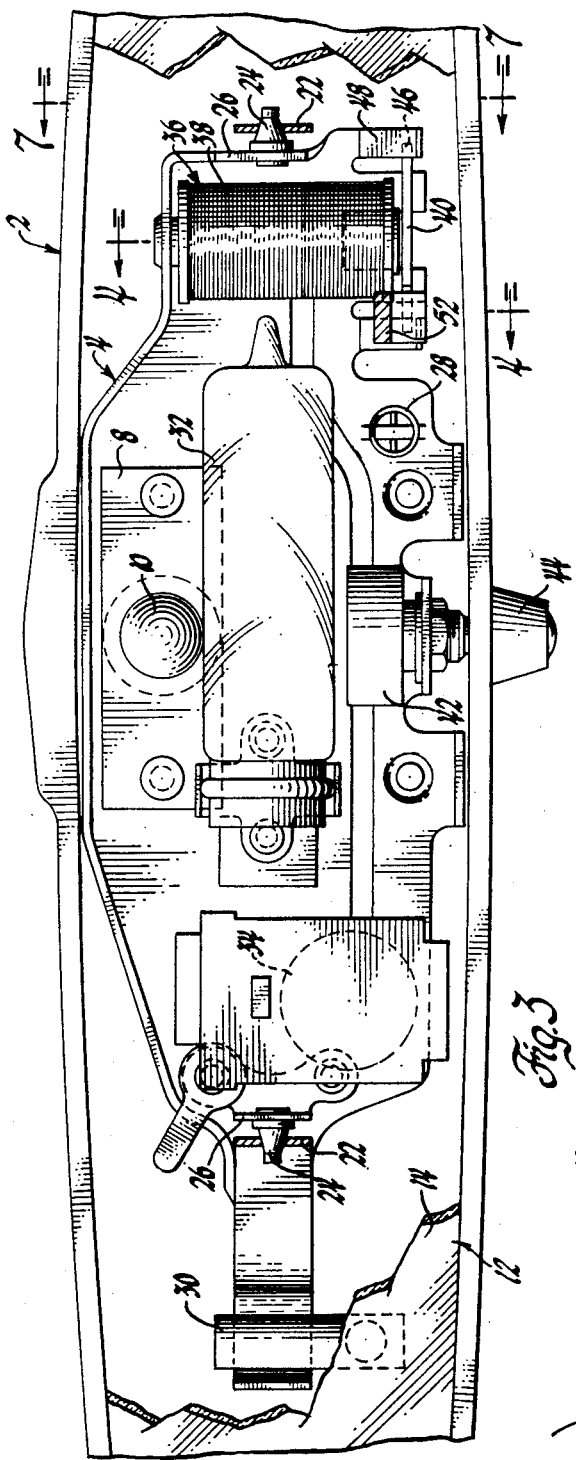
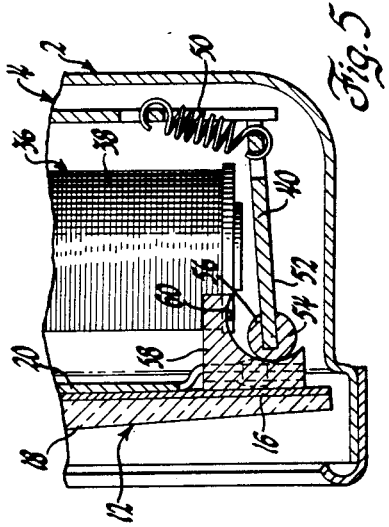
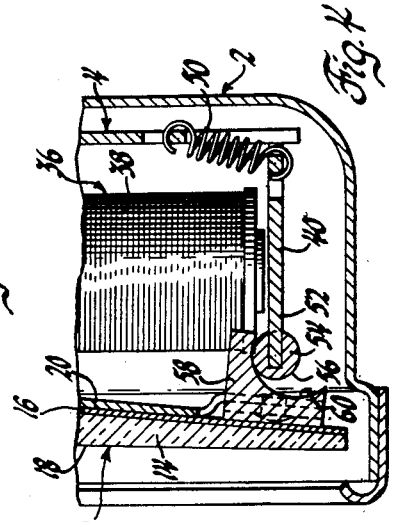

Jan. 29, 1963    M. L. WOODWARD ETAL    3,075,430
NON-GLARE MIRROR
Filed July 6, 1960    3 Sheets-Sheet 3

INVENTORS
Myroeth L. Woodward
BY & Kenneth R. Skinner
ATTORNEY

United States Patent Office 3,075,430
Patented Jan. 29, 1963

3,075,430
NON-GLARE MIRROR
Myrneth L. Woodward, Lapel, and Kenneth R. Skinner, Anderson, Ind., assignors to General Motors Corporation, Detroit, Mich., a corporation of Delaware
Filed July 6, 1960, Ser. No. 41,151
4 Claims. (Cl. 88—77)

This invention pertains to non-glare or anti-glare rear view mirrors and, more particularly, to an operating mechanism for an automatically controlled mirror of this type for use on vehicles such as automobiles.

In general, mirror assemblies of the type to which this invention pertains typically comprise a mirror element having two reflecting surfaces of different reflecting powers pivotally mounted with respect to a support whereby the mirror element may be adjusted from a normal or "day" position in which a relatively intense image is viewable in one of the reflecting surfaces, to a "night" position in which the other surface of the mirror assembly provides a reflected image of relatively reduced intensity. Such mirror assemblies are well known in the art and may comprise, for example, a single prismoidal mirror body having a reflective coating on its rear surface to provide the highly intense image in the "day" position, and a less reflective front surface angularly related relative to the rear surface to provide the image of reduced intensity with the mirror in its non-glare or "night" position. Alternatively, substantially if not identically the same result may be obtained in a mirror assembly comprising two distinct mirror elements or bodies suitably angularly related relative to each other, with the respective elements providing images of different intensities.

Anti-glare mirrors of the type aforedescribed may be manually or automatically operated in order to select the "day" or "night" position, and various means have been devised in the past for this purpose. With respect to manually operated mirrors of this type, reference may be made to the United States Patent 2,356,432 granted to G. E. Roedding on August 22, 1944, and, more recently, to United States Patent 2,913,958, granted to H. C. Mead et al. on November 24, 1959, for typical constructions of this type. A further example of and variation in a manually operated mirror may be seen in United States Patent 2,806,408 granted to J. Moeller on September 17, 1957, which illustrates a type of non-glare mirror which is pivotally adjusted relative to its support through the intermediary of a manually controlled electrical device. With respect to automatically operated mirrors of this type, reference may be made to the copending United States patent application Serial No. 804,472, filed on April 6, 1959, in the name of Myrneth L. Woodward, and disclosing electrical means automatically responsive to light intensity to effect pivotal adjustment of the mirror.

Prior art constructions of this type, be they manually or automatically operable, have achieved varying degrees of success. However, they are not entirely satisfactory for various reasons depending upon the specific nature of the device. For example, irrespective of the type of operation employed for the mirror, noise occasioned by the pivotal adjustment of the mirror assembly has often been a troublesome and aggravating problem. Thus, in these prior assemblies, it has been necessary to utilize one or more stop means to limit the pivotal adjustment of the mirror assembly between and to the "day" and "night" positions. While these stop means may take various forms such as additional members formed on or connected to the support member for the mirror element, the result has been that abutment of the mirror assembly with such a stop member results in an audible sound. Thus, in order to dampen these sounds, some expedient such as rubber bumpers must be employed on the stop means as suggested, for example, in the Woodward application aforementioned.

Referring now to an electrically operated mirror, whether manually or automatically activated, a further problem has been posed with respect to the size or capacity of the electromagnetic device which has been employed in prior art structures to selectively adjust the mirror assembly. Heretofore, the movable mirror assembly itself has acted as the armature of the electromagnetic device. Thus, in one position of the mirror assembly, usually the normal or "day" position, the armature has been relatively far from the electromagnetic coil and core in order to provide the necessary range of pivotal movement of the mirror assembly between its two adjusted positions. As is well known, the greater the distance between the electromagnetic coil and core and its armature, the greater the electromagnetic force required to accomplish at least initial pivotal adjustment of the armature. The result in such prior mirror structures is the need for either a relatively large electromagnet or utilization of additional electrical components in the control circuitry to provide an initial surge of power from the electromagnet.

It is, therefore, a principal object and feature of this invention to provide an improved anti-glare mirror of the type aforedescribed, be it manually or automatically operable, characterized by improved operating means for pivotally adjusting the mirror assembly to the end that the objectionable noise aforementioned is entirely eliminated.

It is yet another object and feature of this invention to provide, in combination with an anti-glare mirror as aforedescribed, an operating means therefor which has the additional function of a relatively silent stop means limiting pivotal adjustment of the mirror assembly to the "day" and "night" positions, thereby eliminating the need for additional stop members.

It is yet another object and feature of this invention to provide an operating means for an electrically operated anti-glare mirror comprising an electromagnet having a pivotally mounted armature operatively connected to the mirror to be adjusted so as to provide a mechanical advantage for moving the load of the mirror, thereby reducing the size or capacity of the electromagnet required and eliminating the need for additional electrical devices for providing an additional surge of power from the electromagnet in initially adjusting the mirror.

It is yet another object and feature of this invention to provide an improved operating means for an anti-glare mirror of the type which is automatically responsive electrically to the intensity of light falling upon a light responsive element, and characterized by an improved control circuit and operating linkage to reduce if not eliminate the amount of audible sound coming from the mirror assembly upon selective adjustment thereof, while simplifying the circuit itself.

In general, these and other objects of the invention are attained in a mirror assembly comprising an electromagnet having a coil and core operatively related to a pivotally mounted armature adapted to control the pivotal adjustment of a mirror assembly between "day" and "night" positions. The movable free end of the armature includes a cam member having an arcuate bearing surface slidably received in bearing engagement with an arcuate bearing surface of a cam follower immovably secured to the mirror assembly to be adjusted. Actuation of the electromagnet resulting in movement of the armature causes the cam to slide along the bearing surface of the cam follower and, due to the relative curvature of the cam and cam follower, the mirror is pivoted from the "day" position to the "night" position. Furthermore, the cam and cam follower are maintained in continuous engagement during movement of the mirror assembly between its extreme positions, and form in and of themselves the means for stopping movement of the mirror in positions corresponding to the desired "day" and "night" positions. Moreover, the armature at its greatest distance from its actuating coil is still much closer to the coil than possible in structures heretofore proposed in which a member carried by the mirror serves as the armature itself. Furthermore, the armature cam and cam follower construction provides a mechanical advantage in that the load of the mirror to be adjusted under the influence of the electromagnet progresses from a minimum at a time when the armature is at its greatest distance from its coil to a maximum when the armature is at its closest distance to the coil, thereby further contributing to elimination of a need for a relatively large electromagnetic construction or auxiliary electrical devices as aforementioned. Finally, the electromagnetic device is preferably of the time delay type so as to provide gradual release of any stresses which may build up in the cam and cam follower construction during operation of the latter under the influence of the electromagnet, thereby eliminating audible sounds which otherwise may occur if such stresses were relatively rapidly released upon de-energization of the electromagnet.

These and other objects of the invention and the manner in which they are attained will become more apparent hereinafter as the description of the invention proceeds, and in which reference is made to the drawings in which:

FIGURE 1 is a front elevation of a preferred embodiment of the anti-glare mirror of this invention with certain parts broken away to reveal certain details of construction;

FIGURE 2 is a section taken on line 2—2 of FIGURE 1;

FIGURE 3 is an enlarged fragmentary view of FIGURE 1 with certain parts broken away to reveal certain additional details of the construction;

FIGURE 4 is a view taken on line 4—4 of FIGURE 3 and showing the mirror in the "night" position;

FIGURE 5 is a view corresponding to FIGURE 4, but showing the mirror assembly in the "day" position;

Figure 6:
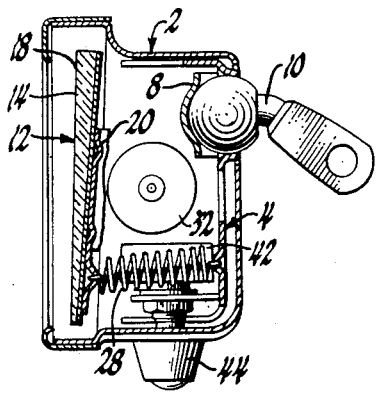
FIGURE 6 is a view taken on line 6—6 of FIGURE 1.
Figure 7:
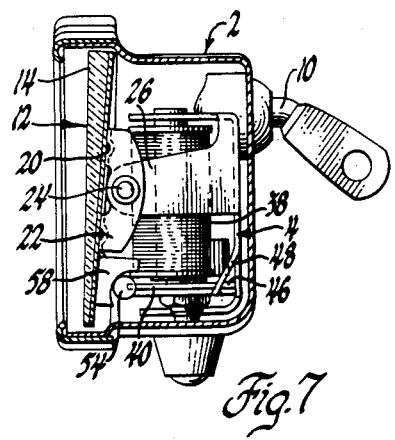
FIGURE 7 is a view taken on line 7—7 of FIGURE 3, but reduced in size.
Figure 8:
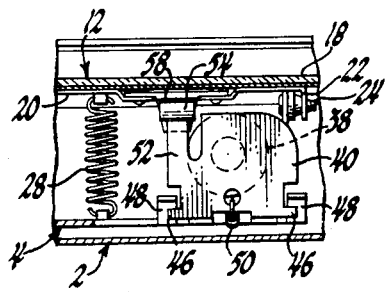
FIGURE 8 is a view taken on line 8—8 of FIGURE 1.

Referring now to the drawings, the numeral 2 generally indicates a mirror housing or frame of dished configuration and the numeral 4 generally indicates a mounting plate rigidly secured interiorly of the frame and to the rear wall of the latter by means of a suitable number of fasteners 6. A mounting strap 8 is suitably secured to the mounting plate 4, and cooperates with the latter and the rear wall of the frame or housing 2 in a conventional and well-known manner to form a socket for a ball stud 10 to adapt the mirror for conventional installation and angular adjustment in a vehicle such as an automobile.

The anti-glare mirror assembly 12 comprises a solid prismoidal mirror element or body 14 having a highly reflective coating 16 substantially coextensive with the rear surface thereof to provide a relatively intense image in the normal or "day" position of the mirror body 14. The front surface 18 of the mirror element 14 is uncoated or otherwise rendered less reflective than the rear surface thereof to provide a front surface image reflection of reduced intensity when the mirror body 14 is disposed in the non-glare or "night" position, as will be apparent to those skilled in the art. A support plate 20 is affixed to the rear of the mirror element by any suitable means such as cement or other adhesive, and is provided with laterally spaced rearwardly projecting lugs 22 adapted to receive the conical pivot pins 24 mounted upon the forwardly projecting laterally spaced ears 26 formed integral with or otherwise secured to frame 2 and the mounting plate 4.

In this manner, the mirror assembly 12 is pivotally mounted relative to its support or the frame 2, and is continuously urged toward the "day" position by means of a spring 28 suitably connected between the mounting plate 4 and the support plate 20 affixed to the rear surface of the mirror.

The control circuit to be described hereinafter in greater detail includes a photocell 30 suitably supported on mounting plate 4 directly to the rear of a window of suitable size formed in the reflective coating 16. The photocell provides a signal for an amplifier including an electron tube 32 also supported on mounting plate 4. The amplifier controls the energization of a control relay 34 for an electromagnet indicated generally at 36 and including the coil assembly 38 mounted by its core on the mounting plate 4 so that the coil assembly is suspended vertically opposite to a generally horizontally disposed thin metal armature 40. Also supported within the mirror housing 2 is a potentiometer 42 having an operating shaft extending through the housing to a control knob 44 to permit adjustment of the system sensitivity by the operator of the vehicle.

Referring now particularly to FIGURES 2 through 5 and 8, it may be seen that the armature 40 is provided at one end with a pair of aligned laterally projecting members 46 adapted to be confined between ears 48 projecting forwardly and downwardly from the mounting bracket 4, with the rear edge of the armature abutting the bracket. A spring 50 is suitably connected between a rearward portion of the armature and the mounting bracket 4 so as to continuously urge the projections 46 into proper pivotally mounted engagement with the mounting bracket 4. An arm 52 extends forwardly from the mounting bracket 4, and fixedly mounts a cam 54 of suitable anti-friction material which includes a generally cylindrical or arcuate external bearing surface 56.

A cam follower 58 preferably of the same material as cam 54 is suitably fixedly secured to the support plate 20 adjacent the rear surface of the mirror element 14, and is provided with a generally cylindrical or arcuate bearing surface 60 having, it will be noted, a relatively greater radius of curvature than the radius of curvature of the bearing surface 56 of the cam 54. The cam 54 is adapted to be received within the cam follower 58 for relative sliding movement relative thereto, the spring 50 serving to continuously urge these members into engagement with each other as the mirror element is pivoted between its two extreme positions in a manner to be described.

At this juncture, however, it should be noted that the coaction between the respective arcuate bearing surfaces of the cam 54 and cam follower 58 serve to stop pivotal movement of the mirror assembly 12 in either of the two extreme positions indicated in FIGURES 4 and 5. Thus, FIGURE 5 illustrates the relative positions of the cam and cam follower with the mirror element disposed in the "day" position to which it is continuously urged by the spring 28. Inasmuch as the armature 40 and cam 54 are substantially at dead center relative to the arcuate bearing surface 60 of the cam follower 58, further movement of the mirror beyond this position is stopped. Conversely, when the armature 40 is pivotally adjusted under the influence of the coil 38 in a manner to be described, the cam 54 slides along the surface of the cam follower 58 to the position shown in FIGURE 4, resulting in pivotal adjustment of the mirror element to the "night" position illustrated until such time as the cam follower and cam assume the position shown in FIGURE 4. At this time, the effective force applied by the cam 54 on the surface of the cam follower 58 is substantially normal to the tangent to the latter surface, thereby disrupting any further pivoting action and forming a stop or limiting device to dispose the mirror in the "night" position. Then, when the coil 38 is deenergized, the spring 28 again returns the mirror element to the FIGURE 5 position resulting in relative sliding movement between the cam 54 and cam follower 58 until the stop position of FIGURE 5 is again obtained.

Furthermore, it will be noted that the maximum distance between the armature 40 and the coil 38 occurs when the mirror element is in the "day" position of FIGURE 5, and they are closest to each other in the "night" position of FIGURE 4. However, the distance illustrated in FIGURE 5 is less than in the prior art constructions aforedescribed in which the armature 40 took the form of a member directly mounted to the rear of the mirror such as support plate 20. Consequently, the operating force required from the coil 38 being directly proportional to its distance from its cooperating armature, a much smaller coil can be utilized in the electromagnet of this construction than in the prior art devices.

Moreover, the armature construction and the relative configurations of the bearing surfaces of the cam 54 and the cam follower 58 result in a mechanical advantage further contributing to the use of a smaller coil than usual. Thus, it may be seen that the curvature of the surface 60 of the cam follower is such as to provide a horizontal reactive force thereon which progresses from a maximum in the FIGURE 5 position to a minimum or zero in the FIGURE 4 position. Thus, when the distance between the coil 38 and its armature 40 is the greatest, the mechanical advantage provided from the aforementioned construction is at a maximum and, as such mechanical advantage diminishes, similarly the distance between the armature and the coil diminishes thereby resulting in a coil of relatively small size being capable of applying the electromagnetic force required to adjust the mirror assembly.

Figure 9:
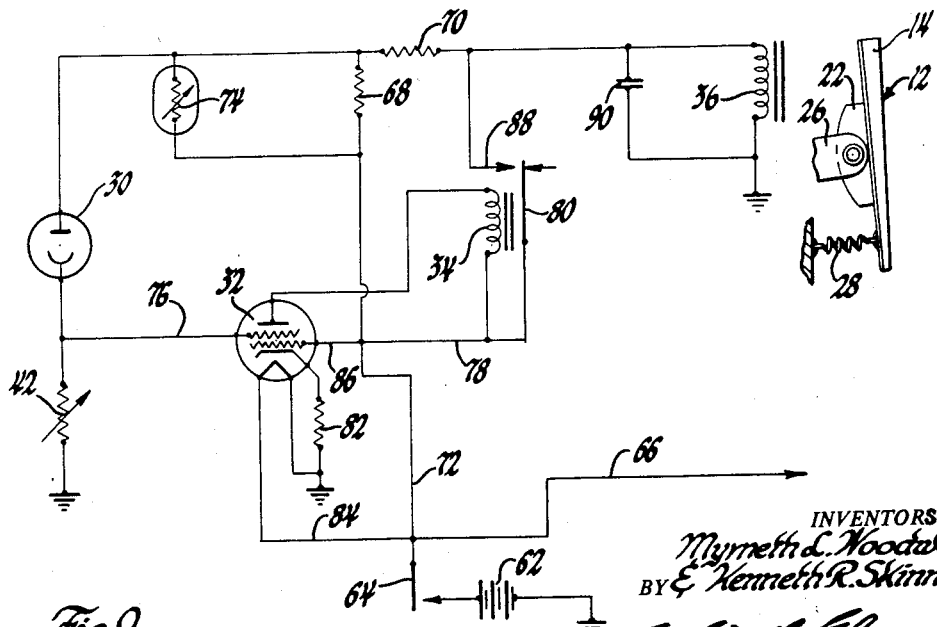
FIGURE 9 is a schematic diagram of the control circuit for the mirror.

Referring now to FIGURE 9, the control circuit is shown in schematic fashion and components thereof referred to in the foregoing description are again referred to by the same reference characters. The control circuit is energized from a voltage source, such as the car battery 62, having one terminal connected to ground, such as the vehicle body, and the other terminal connected to a manually actuable switch 64. A conductor 66 is provided to supply other circuits associated with the vehicle. A signal voltage generating circuit includes the photocell 30 which is suitably a photo-conductive cell and exhibits decreased electrical resistance with increased incident light intensity. The photocell is connected with the voltage source through a voltage divider including resistors 68 and 70 which are connected in series across the voltage source through conductor 72 and the energizing coil of electromagnet 36. The photocell is connected in series with the potentiometer 42 between the junction of the voltage divider resistors and ground. A thermistor 74 having a negative temperature coefficient of resistance is connected in parallel with the voltage divider resistor 68 to provide temperature compensation for the photocell. The signal voltage is developed across potentiometer resistor 42 and applied through conductor 76 to the control grid of the electron tube 32. The positive voltage from the battery is applied through switch 64 and a conductor 78 to the energizing coil of the control relay 34 and to its movable contact 80 and hence to the plate of electron tube 32. The cathode of the tube is connected to ground through a cathode bias resistor 82 and the heater filament is connected between the conductor 72 and ground through the conductor 84. The positive battery voltage is applied directly to the accelerating grid of the tube through the conductor 86. The conductor 72 is connected through the movable contact 80 and a fixed contact 88 of the control relay 34 to apply battery voltage to the electromagnet 36. The electromagnet 36 is of the time delay type having a desired time delay provided by a capacitor 90 connected in parallel with the coil of the electromagnet 36.

In operation, with the mirror assembly installed in an automobile and properly adjusted to provide the driver with a field of view to the rear of the automobile, the photocell 30 "looks" through the mirror and responds to the light incident upon the mirror. The dark resistance of the photocell is very high so that when there are no cars approaching from the rear very little current flows through the photocell. Consequently, the voltage across the potentiometer 42 and at the control grid of the electron tube is substantially zero. With this control grid voltage, together with a biasing action of the cathode bias resistor 82, the conduction of electron tube is insufficient to pull in the control relay 34 and the contacts 80 and 88 are open. With the control relay contacts open, the electromagnet 36 is deenergized and the mirror is held in its normal or "day" position by the spring 28 as limited by coaction between the cam 54 and cam follower 58 as indicated in FIGURE 5 and previously described. The sensitivity of the system is determined by the voltage across the photocell and, in this dark condition, the resistor 70 is connected to ground through the coil of the electromagnet so that the voltage on the photocell is about one-half the battery voltage.

When a car approaches from the rear, the light from its headlamps impinges upon the photocell 30 and reduces its resistance. With increased light intensity, current begins to flow through the photocell and the voltage on the control grid of electron tube becomes more positive. Thus, the conduction of the tube increases and at a predetermined value of light intensity, the control relay 34 is pulled in causing the movable contact 80 to engage the fixed contact 88. Consequently the battery voltage is applied to the winding of electromagnet 36 to pivot the mirror to its "night" position as illustrated in FIGURE 4, and as limited by the coaction between the bearing surfaces of the cam 54 and the cam follower 58 as previously described. Simultaneously with actuation of the mirror, the sensitivity of the system is increased to prevent hunting or cycling of the system in response to slight changes in light intensity. This increased sensitivity results from the connection of the resistor 70 to the positive terminal of the battery through the relay contacts 80 and 88, thus raising the voltage across the photocell 30 and potentiometer 42 to the full battery voltage. The sensitivity of the photocell is stabilized against temperature variations by the thermistor 74 which is effective to decrease the voltage on the photocell as it becomes increasingly sensitive with a decrease in temperature, and vice-versa.

When the light intensity decreases, the conduction of the electron tube will decrease until the control relay 34 drops out causing the relay contacts 80 and 88 to open which deenergizes the electromagnet 36 and the mirror 12 is returned to its normal position as indicated in FIGURE 5. However, there is a time delay involved in deenergization of the electromagnet 36 under the influence of the capacitor 90 which discharges through the electromagnet coil after the control relay contacts have opened. The purpose of this arrangement is to insure that deenergization of the coil is slow enough that any stresses which may have been induced in the mechanical parts of the assembly such as the armature 40 are released gradually, thus preventing any noise which would otherwise be audible from the rapid release of such stresses.

In order that the driver may adjust the sensitivity of the system to suit his preference, the potentiometer 42 may be adjusted by knob 44 to change the magnitude of the signal voltage on the control grid of the electron tube for a given value of light intensity to establish the operating point of the system.

While but one form of the invention has been shown and described, other forms will be apparent to those skilled in the art. Therefore, the embodiment shown in the drawing is merely for illustrative purposes, and is not intended to limit the scope of the invention which is defined by the claims which follow.

We claim:
1. An anti-glare rear view mirror mechanism comprising a support, a mirror assembly having two reflect- ing surfaces of different reflecting powers, means pivotally connecting said mirror assembly to said support for tilting movement relative thereto between first and second positions, yieldable means connected between said support and mirror assembly to urge the latter continuously toward said first position, a time delay relay including a coil mounted on said support and an armature having one end pivotally connected on said support, a cam fixed to the other end of said armature and having an arcuate external bearing surface, a cam follower fixed to said mirror assembly and including an arcuate bearing surface having a greater radius of curvature than said cam bearing surface, said cam being received in bearing engagement within said cam follower for relative sliding movement therebetween, yieldable means connected between said support and armature to urge said cam continuously into bearing engagement with said cam follower as said mirror assembly is pivoted between said positions, said cam having a first position relative to said cam follower forming a stop limiting movement of said mirror assembly to said first position under the influence of said first-named yieldable means and a second position relative to said cam follower forming a stop limiting movement of said mirror assembly to said second position in opposition to said first-named yieldable means, and means for energizing said relay coil to attract said armature whereby said mirror assembly is pivoted from said first position to said second position.

2. An anti-glare rear view mirror mechanism comprising a support, a mirror assembly having two reflecting surfaces of different reflecting powers, means pivotally connecting said mirror assembly to said support for tilting movement relative thereto between two extreme positions, yieldable means connected between said support and mirror assembly to urge the latter continuously toward one of said positions, a driving lever pivotally mounted on said support for driving said mirror assembly, cooperating camming means formed on the driving lever and the mirror assembly, said camming means including a curved cam and an arcuate concave bearing surface having a radius of curvature substantially greater than the radius of curvature of the cam, said concave bearing surface being concave toward said cam, means for pivoting the lever to cause the cam to move along the bearing surface to drive the mirror assembly from one of said positions to the other of said positions in opposition to the yieldable means, said arcuate concave bearing surface partially encircling the cam and maintaining continuous contact therewith so that certain portions of the curvature of the bearing surface form stops to limit pivotal movement of the mirror assembly to said two extreme positions.

3. An anti-glare rear view mirror mechanism comprising a support, a mirror assembly having two reflecting surfaces of different reflecting powers, means pivotally connecting said mirror assembly to said support for tilting movement relative thereto between two extreme positions, yieldable means connected between said support and mirror assembly to urge the latter continuously toward one of said positions, a driving lever pivotally mounted on said support for driving said mirror assembly, cooperating camming means formed on the driving lever and the mirror assembly, said camming means including a curved cam and an arcuate concave bearing surface having a radius of curvature substantially greater than the radius of curvature of the cam, said concave bearing surface being concave toward said cam, yieldable means connected between the support and the lever to urge said cam continuously into sliding engagement with said bearing surface as said mirror assembly moves between said positions, means for pivoting the lever to cause the cam to move along the bearing surface to drive the mirror assembly from one of said positions to the other of said positions in opposition to the first-named yieldable means, said concave arcuate bearing surface partially encircling the cam and maintaining continuous contact therewith so that certain portions of the curvature of the bearing surface act to form stops to limit pivotal movement of the mirror assembly to said two extreme positions.

4. An anti-glare rear view mirror mechanism comprising a support, a mirror assembly having two reflecting surfaces of different reflecting powers, means pivotally connecting said mirror assembly to said support for tilting movement relative thereto between two extreme positions, yieldable means connected between said support and mirror assembly to urge the latter continuously toward one of said positions, a driving armature pivotally mounted on said support for driving said mirror assembly, cooperating camming means formed on the armature and the mirror assembly, said camming means including a curved cam and an arcuate concave bearing surface having a radius of curvature substantially greater than the radius of curvature of the cam, said concave bearing surface being concave toward said cam, an armature energizing coil mounted on the support, means for energizing the coil to attract the driving armature and cause the cam to move along the bearing surface to drive the mirror assembly from one of said positions to the other of said positions in opposition to the yieldable means, said arcuate concave bearing surface partially encircling the cam and maintaining continuous contact therewith so that certain portions of the curvature of the bearing surface act to form stops to limit pivotal movement of the mirror assembly to said two extreme positions.

References Cited in the file of this patent

UNITED STATES PATENTS

| 1,887,706 | Bettman | Nov. 15, 1932 |
| 2,806,408 | Moeller | Sept. 17, 1957 |
| 2,843,017 | Ponce | July 15, 1958 |
| 2,912,685 | Thomas | Nov. 10, 1959 |

FOREIGN PATENTS

| 785,041 | Great Britain | Oct. 23, 1957 |